(12) United States Patent
Imoto et al.

(10) Patent No.: US 9,681,014 B2
(45) Date of Patent: *Jun. 13, 2017

(54) IMAGE READING APPARATUS AND IMAGE FORMING APPARATUS EQUIPPED THEREWITH

(71) Applicant: Sharp Kabushiki Kaisha, Sakai-shi, Osaka (JP)

(72) Inventors: Masahiro Imoto, Sakai (JP); Kenji Nakanishi, Sakai (JP); Yasuhiro Suto, Sakai (JP); Shohichi Fukutome, Sakai (JP); Kazuhiro Iguchi, Sakai (JP); Hiroki Kuruma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,915

(22) Filed: Jul. 14, 2016

(65) Prior Publication Data

US 2016/0323474 A1 Nov. 3, 2016

Related U.S. Application Data

(63) Continuation of application No. 14/692,870, filed on Apr. 22, 2015, now Pat. No. 9,420,140.

(30) Foreign Application Priority Data

Jun. 16, 2014 (JP) .................. 2014-123630

(51) Int. Cl.
*H04N 1/04* (2006.01)
*H04N 1/028* (2006.01)
(Continued)

(52) U.S. Cl.
CPC ..... *H04N 1/02895* (2013.01); *H04N 1/00997* (2013.01); *H04N 1/028* (2013.01); *H04N 1/193* (2013.01)

(58) Field of Classification Search
CPC ..... H04N 1/00615; G01S 17/46; G01S 17/89; G03B 27/542; G03B 27/735; G03H 1/26
(Continued)

(56) References Cited

U.S. PATENT DOCUMENTS 6,160,641 A * 12/2000 Kaneko .................. H04N 1/107
358/474
6,172,784 B1  1/2001 Konda
(Continued)

FOREIGN PATENT DOCUMENTS

JP  2000-050031 A  2/2000

*Primary Examiner* — Negussie Worku
(74) *Attorney, Agent, or Firm* — Keating & Bennett, LLP

(57) ABSTRACT

An image reading apparatus has a light source unit for illuminating an object to be illuminated, a reading unit for reading the object illuminated by the light source unit, a reflective unit, having at least a first reflection mirror, for reflecting reading light reflected by the object toward the reading unit, and a first light blocking portion for partially blocking light except the reading light. The first reflection mirror has a reflecting surface for reflecting the reading light, and an end surface substantially orthogonal to the reflecting surface. The first light blocking portion extends in a longitudinal direction of the first reflection mirror toward the end surface of the first reflection mirror, with a tip end of the first light blocking portion being opposed to the end surface of the first reflection mirror with a gap therebetween.

15 Claims, 6 Drawing Sheets

(51) Int. Cl.
*H04N 1/00* (2006.01)
*H04N 1/193* (2006.01)

(58) Field of Classification Search
USPC ......... 358/403, 474, 475, 509, 496; 362/301
See application file for complete search history.

(56) References Cited

U.S. PATENT DOCUMENTS

| | | | | |
|---|---|---|---|---|
| 7,274,495 | B2* | 9/2007 | Tseng | H04N 1/1017 |
| | | | | 250/208.1 |
| 7,505,184 | B2* | 3/2009 | Hayashide | H04N 1/00002 |
| | | | | 358/474 |
| 9,094,563 | B2* | 7/2015 | Enomoto | H04N 1/00588 |
| 9,357,096 | B2* | 5/2016 | Enomoto | H04N 1/00551 |
| 9,420,140 | B2* | 8/2016 | Imoto | H04N 1/02895 |
| 2011/0199652 | A1* | 8/2011 | Imoto | H04N 1/02815 |
| | | | | 358/474 |
| 2014/0226191 | A1* | 8/2014 | Enomoto | H04N 1/00588 |
| | | | | 358/496 |
| 2014/0376068 | A1* | 12/2014 | Imoto | H04N 1/1026 |
| | | | | 358/497 |
| 2015/0055195 | A1* | 2/2015 | Suto | H04N 1/02815 |
| | | | | 358/475 |
| 2015/0229800 | A1* | 8/2015 | Imoto | H04N 1/1026 |
| | | | | 74/89.22 |

* cited by examiner

IMAGE READING APPARATUS AND IMAGE FORMING APPARATUS EQUIPPED THEREWITH

CROSS-REFERENCE TO RELATED APPLICATIONS

This application claims priority under 35 U.S.C. §119(a) to Patent Application No. 2014-123630, filed in Japan on Jun. 16, 2014, the entire contents of which are incorporated herein by reference.

BACKGROUND OF THE INVENTION

Field of the Invention

The present invention relates to an image reading apparatus for reading an original, etc., and an image forming apparatus equipped with this image reading apparatus.

Related Art

In this type of image reading apparatus, the reading operation is performed while an original is transported in a sub-scanning direction on a glass, by allowing a light source unit below the glass to illuminate the original and allowing an imaging element such as a CCD (Charge Coupled Device) to scan the original repeatedly in a main scanning direction. The reading operation is also performed while an original is positioned and set on a glass, by allowing the light source unit, the imaging element, etc. below the glass to move in a sub-scanning direction, allowing a light source unit to illuminate the original, and allowing the imaging element to scan the original repeatedly in a main scanning direction. The light source unit for illuminating the original may be of various types, including a fluorescent light or an LED array.

According to the image taking process by this image reading apparatus, the light for illuminating the original is emitted by the light source or the like and reaches an original surface via the light guiding member or the like. The reflected light (reading light) that is reflected by the original surface is guided along a predetermined optical path to the imaging element such as a CCD. In this process, light which reaches the imaging element from an unintended optical path (so-called stray light) causes adverse influences such as noise or ghost in the taken image of the original.

Attempts to reduce such adverse influences by stray light have been made and known in the conventional art. JP 2013-138388 A (hereinafter called "Patent Literature 1") prevents stray light by placing a light blocking plate in the vicinity of a light guiding member which is arranged closely to the light source. If the angle of emission by the light guiding member deviates from the regular range, the light blocking plate prevents such light from entering a reflection mirror. JP 2004-157174 A (hereinafter called "Patent Literature 2") provides an elastic light blocking member between a light source and a contact glass on which an original is set. An original is illuminated with light through a slit-like opening formed in the main scanning direction. Then, reading light reflected by the original is allowed to be incident on a mirror from the slit-like opening and is led to the imaging element.

However, stray light to be blocked by Patent Literature 1 is limited to the one which is directly incident on the mirror through the light guiding plate on the light source side. When light is reflected by the original and incident on the mirror (as reflected light, or reading light), it is impossible to prevent a portion of the reflected light travelling along an unintended optical path (as stray light) from reaching the imaging element. Hence, Patent Literature 1 fails to provide sufficient measures against stray light.

In Patent Literature 2, a frame for holding the light source is in contact with the mirror and covers a part of the reflecting surface of the mirror. This structure decreases an area of the mirror on which the reading light is incident. Hence, there are risks of vignetting of the reading light, or deviation of an optical axis of the mirror due to thermal deformation of the frame under the operational heat. Besides, if the mirror and the frame are separated in Patent Literature 2 in order to prevent such vignetting and deviation of the optical axis, it is difficult to block stray light which passes through a gap between the mirror and the frame. In this case, incident light on a side surface of the mirror, which is not the reflecting surface, may also act as stray light.

For a carriage structure in which the light source unit and the reading unit are integrated, it is particularly difficult to provide sufficient measures against stray light. This is because, in comparison with a structure in which the light source unit and the reading unit are separated from each other, the carriage structure has a smaller distance from the slit through which the reading light from the original enters to the CCD serving as the imaging element. It is also because the carriage structure requires a complicated arrangement for the reflective optical system and the optical path in order to reflect the reading light to the imaging element.

SUMMARY OF THE INVENTION

The present invention provides an image reading apparatus and an image forming apparatus which are capable of preventing stray light effectively, while preventing not only deviation of an optical axis due to interference between the frame and the mirror but also vignetting of the reading light on the reflecting surface side of the mirror.

An image reading apparatus according to the present invention includes: a light source unit for illuminating an object to be illuminated; a reading unit for reading the object illuminated by the light source unit; a reflective unit, having at least a first reflection mirror, for reflecting reading light reflected by the object toward the reading unit; and a first light blocking portion for partially blocking light except the reading light. The first reflection mirror has a reflecting surface for reflecting the reading light, and an end surface substantially orthogonal to the reflecting surface. The first light blocking portion extends in a longitudinal direction of the first reflection mirror toward the end surface of the first reflection mirror, with a tip end of the first light blocking portion being opposed to the end surface of the first reflection mirror with a gap therebetween.

In this image reading apparatus of the present invention, the end surface of the first reflection mirror is opposed to the first light blocking portion. This structure can prevent vignetting of the reading light on the reflecting surface side and can simultaneously prevent entry of stray light at the end surface of the first reflection mirror. In addition, the gap between the end surface and the first light blocking portion avoids interference between the first reflection mirror and the first light blocking portion. Therefore, even when the frame is deformed due to impact or heat, this structure can limit deformation or fall of the first reflection mirror and can prevent deviation of the optical axis of the first reflection mirror.

The image reading apparatus of the present invention may be also equipped with a scanner for scanning the object (the object to be illuminated), the scanner having a housing and a lid-like holding member provided with respect to the housing. The light source unit may be held by the lid-like holding member. The first light blocking portion may be integrally molded with the lid-like holding member.

Integral molding of the first light blocking portion with the lid-like holding member enables a simple and high-precision positioning of the first reflection mirror and the first light blocking portion, and can further improve the mechanical strength of the lid-like holding member. Since the first light blocking portion can be molded in the same step as the molding of the lid-like holding member, it is also possible to simplify the production process and to reduce the number of components.

In the image reading apparatus of the present invention, reflected light from the object (the object to be illuminated) may be firstly reflected by the first reflection mirror.

In this case, the first light blocking portion is provided face to face with the end surface of the first reflection mirror which is arranged most closely to an original, which is an object to be illuminated. As a result, stray light from the outside can be blocked effectively.

The image reading apparatus of the present invention may be also equipped with another reflection mirror fixed in the housing, and a second light blocking portion, provided between the gap and a reflecting surface of the other reflection mirror, for blocking stray light that has passed through the gap.

The thus provided second light blocking portion can block the stray light which has passed through the gap between the end surface of the first reflection mirror and the first light blocking portion, and can prevent the stray light further.

In the image reading apparatus of the present invention, the light source unit may be equipped with an elongated light guiding member having translucency, and a light emitting element provided on a longitudinal end side of the light guiding member.

This arrangement not only achieves miniaturization of the light source unit but also allows light to be evenly illuminated on the original.

Additionally, an image forming apparatus according to the present invention includes the image reading apparatus according to the present invention as described above, and a printing unit for printing an image of the object (the object to be illuminated) on a recording sheet, the image being read by the image reading apparatus.

This image forming apparatus can achieve similar operations and effects to those achieved by the above-mentioned image reading apparatus of the present invention.

In the present invention, the end surface of the first reflection mirror is opposed to the first light blocking portion with a gap. This structure can prevent vignetting of the reading light on the reflecting surface side and can simultaneously prevent entry of the stray light at the end surface of the first reflection mirror. Besides, even when the frame is deformed due to impact or heat on the apparatus, this structure can limit deformation or fall of the first reflection mirror and can prevent deviation of the optical axis of the first reflection mirror. Accordingly, it is possible to provide an image reading apparatus and an image forming apparatus which are capable of preventing stray light sufficiently, while preventing not only deviation of the optical axis due to interference between the frame and the mirror but also vignetting of the reading light on the reflecting surface side of the mirror.

DESCRIPTION OF PREFERRED EMBODIMENTS

First Embodiment

Embodiments of the present invention are hereinafter described with reference to the drawings.

Figure 1:
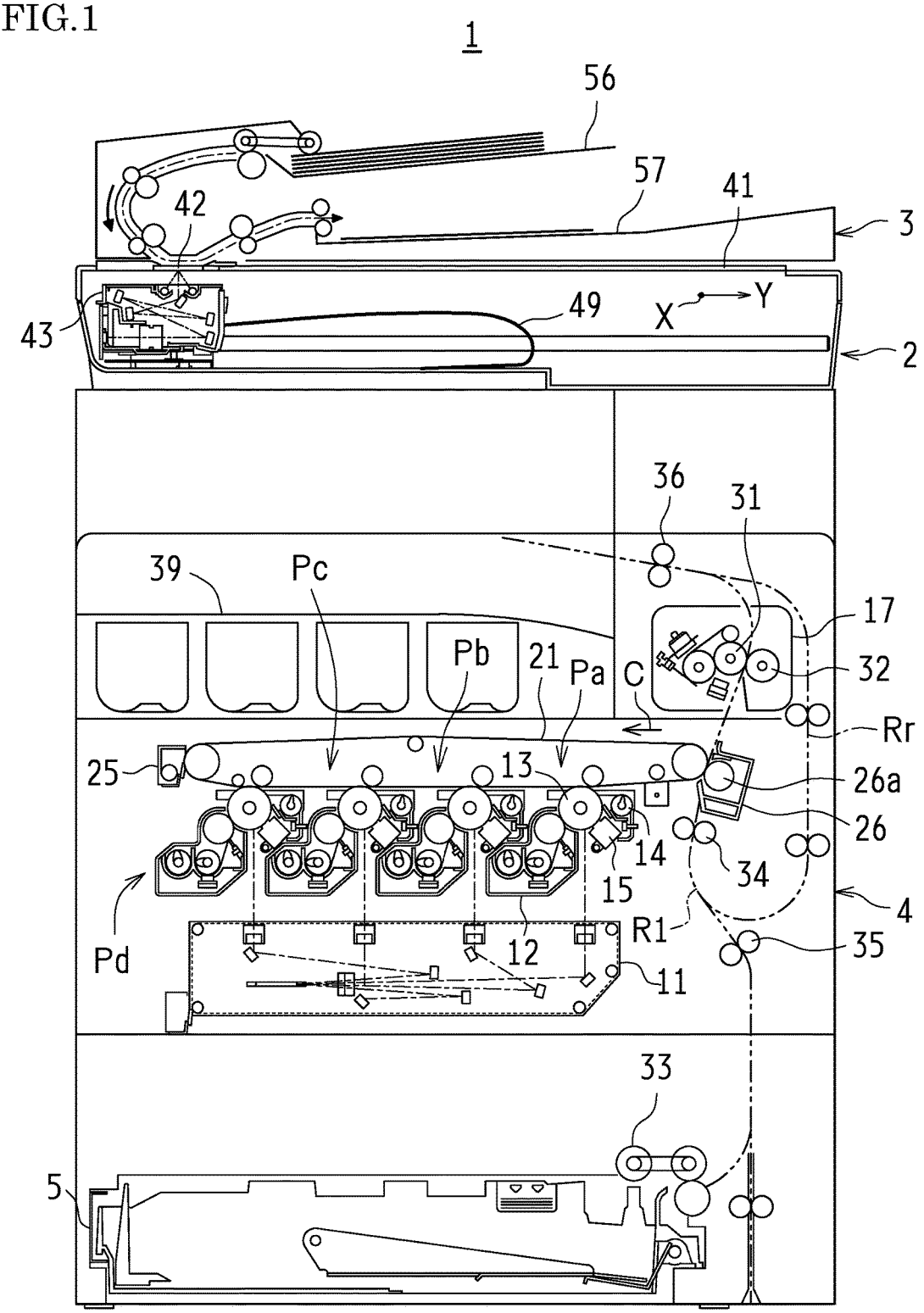
FIG. 1 is a cross section of an image forming apparatus equipped with an image reading apparatus according to the first embodiment of the present invention.

FIG. 1 is a cross section of an image forming apparatus equipped with an image reading apparatus according to the first embodiment of the present invention. The image forming apparatus 1 has a copier function of reading an original and printing an image on a recording sheet, and is equipped with an image reading apparatus 2, an original transporting apparatus 3, a printing unit 4, a feeding cassette 5, etc.

Image data processed by this image forming apparatus 1 are color image data composed of black (K), cyan (C), magenta (M), and yellow (Y), and monochrome image data composed of one color (e.g. black). To form four kinds of toner images corresponding to these colors, the printing unit 4 include four development devices 12, four photosensitive drums 13, four drum cleaning devices 14, and four charging units 15, which constitute four imaging stations Pa, Pb, Pc, Pd corresponding to black, cyan, magenta, and yellow, respectively.

In each of the imaging stations Pa, Pb, Pc, Pd, residual toner on the surface of the photosensitive drum 13 is removed and collected by the drum cleaning device 14. Then, the surface of the photosensitive drum 13 is evenly electrostatically charged at a predetermined potential by the charging unit 15. The surface of the photosensitive drum 13 is exposed by the optical scanning device 11 to form an electrostatic latent image on the surface. An electrostatic latent image formed on the surface of the photosensitive drum 13 is developed by the development device 12 to form a toner image on the surface of the photosensitive drum 13. In this manner, a toner image of each color is formed on the surface of the photosensitive drum 13.

Subsequently, while an intermediate transfer belt 21 revolves in the direction of arrow C, residual toner on the intermediate transfer belt 21 is removed and collected by a belt cleaning device 25. Thereafter, the toner image of each color formed on the surface of the photosensitive drum 13 is sequentially transferred on top of each other to form a color toner image on the intermediate transfer belt 21.

A nip region is formed between the intermediate transfer belt 21 and a transfer roller 26a of a secondary transfer device 26. While a recording sheet transported in a sheet transport path R1 passes through the nip region in a sandwiched manner, the color toner image formed on the surface of the intermediate transfer belt 21 is transferred on the recording sheet. The recording sheet is then heated and pressed between a heating roller 31 and a pressure roller 32 of a fixing device 17, so that the color toner image on the recording sheet is fixed.

Incidentally, a recording sheet is picked up from the feeding cassette 5 by pick-up rollers 33, conveyed in the sheet transport path R1 via the secondary transfer device 26 and the fixing device 17, and discharged to a discharge tray 39 through discharge rollers 36. The sheet transport path R1 is provided with registration rollers 34, transport rollers 35, the discharge rollers 36, and the like. The registration rollers 34 stop the recording sheet temporarily to align the leading end of the recording sheet, and resumes transport of the recording sheet in synchronization with the transfer timing of the color toner image at the nip region between the intermediate transfer belt 21 and the transfer roller 26a. The transport rollers 35 promote transport of a recording sheet.

In the case where an image is printed not only on the front side of the recording sheet but also on a reverse side thereof, the recording sheet is transported in reverse from the discharge rollers 36 to a reverse path Rr where the recording sheet is turned over. The inverted recording sheet is guided again to the registration rollers 34, so that an image is recorded and fixed on the reverse side of the recording sheet in a similar manner as the front side of the recording sheet. Finally, the recording sheet is discharged to the discharge tray 39.

Figure 2:
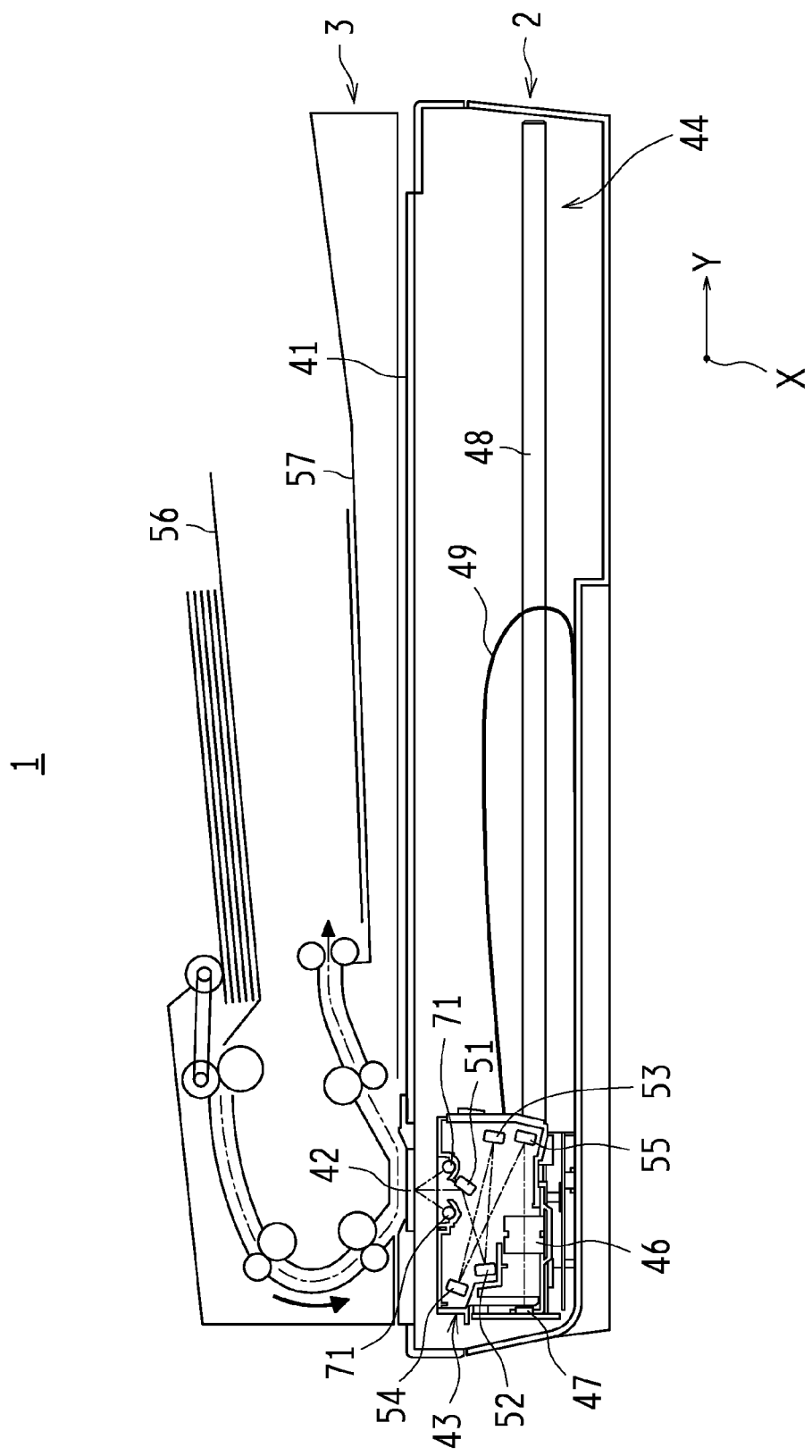
FIG. 2 is a cross section of an image reading apparatus and an original transporting apparatus in FIG. 1.

Next, the description turns to the image reading apparatus 2 according to the first embodiment. FIG. 2 is a cross section of the image reading apparatus 2 and the original transporting apparatus 3.

In FIG. 2, the far side of the original transporting apparatus 3 is pivotally hinged with one side of the image reading apparatus 2 which is located below (a hinge is not shown). The original transporting apparatus 3 is opened and closed by raising and lowering the near side of the original transporting apparatus 3. When the original transporting apparatus 3 is opened, a platen glass 41 of the image reading apparatus 2 becomes accessible.

The image reading apparatus 2 is equipped with a platen glass 41, an original reading glass 42, a scanning unit 43, a movement unit 44, etc. The movement unit 44 includes a guide shaft 48 for guiding the scanning unit 43 in the sub-scanning direction Y, and a driving unit (not shown) for moving and positioning the scanning unit 43 in the sub-scanning direction Y.

The scanning unit 43 includes a light source unit, an imaging lens 46, a CCD (Charge Coupled Device) 47, first to fifth reflection mirrors 51-55 which constitute a reflection unit, etc. The scanning unit 43 is moved by the movement unit 44 to a position below the platen glass 41 or the original reading glass 42, so as to read an original (an object to be illuminated) set on the platen glass 41 (first reading mode) or to read an original (an object to be illuminated) conveyed over the original reading glass 42 (second reading mode).

In the first reading mode, the scanning unit 43 is moved by the movement unit 44 to a position below the platen glass 41. The original transporting apparatus 3 is opened in order to set an original on the platen glass 41, and then closed. While the scanning unit 43 is moved by the movement unit 44 at a fixed speed in the sub-scanning direction Y, by a distance corresponding to the size of the original, the original on the platen glass 41 is illuminated by the light source unit. Light reflected by the original is sequentially reflected by the first to fifth reflection mirrors 51-55 and guided to the imaging lens 46, along the optical path shown in dashed line in the figure. The imaging lens 46 focuses the light reflected by the original on the CCD 47 and allows an image on the front side of the original to be formed on the CCD 47 (reading unit). The CCD 47 repeatedly scans the image on the front side of the original in the main scanning direction X and thereby reads the image on the front side of the original.

In the second reading mode, the scanning unit 43 is moved and positioned by the movement unit 44 to a position below the original reading glass 42. The original transporting apparatus 3 draws out an original from an original tray 56, conveys the original in the sub-scanning direction Y over the original reading glass 42, and discharges the original to the original discharge tray 57. While the original passes over the original reading glass 42, the front side of the original is illuminated through the original reading glass 42 by the light source unit in the scanning unit 43. Light reflected by the front side of the original is sequentially reflected by the first to fifth reflection mirrors 51-55 in the scanning unit 43 and guided to the imaging lens 46, along the optical path shown in dashed line in the figure. The imaging lens 46 focuses the light reflected by the front side of the original on the CCD 47 and allows an image on the front side of the original to be formed on the CCD 47. The CCD 47 repeatedly scans the image on the front side of the original in the main scanning direction X and thereby reads the image on the front side of the original.

Regarding the light source unit in the scanning unit 43, light guiding members 71 are arranged on both sides of a slit St which extends in the main scanning direction X. In each of the light guiding member 71, LEDs 72 (light emitting elements, see FIG. 4) are provided on light incident planes at both ends of the light guiding member 71. Instead of LEDs 72, other types of semiconductor devices, light bulbs, etc. are also applicable.

Each light guiding member 71 is composed of an elongated translucent main body having translucency and having a substantially cylindrical shape. The light guiding member 71 has light incident planes on the longitudinal ends of the translucent main body. A light exit plane 71a is formed on a longitudinal side surface of the translucent main body. A light reflecting plane is formed on another longitudinal side surface of the translucent main body, opposite to the light exit plane. The light guiding members 71 are made by shaping an acrylic resin in a mold.

According to the light source unit having this configuration, the LEDs 72 are arranged face to face with the light incident planes at both ends of each light guiding member 71. Hence, light emitted from the LEDs 72 is incident on the light incident planes of the light guiding member 71, guided inside the light guiding member 71, and exits directly from the light exit plane or exits from the light exit plane after reflected by the light reflecting plane.

The light exit plane of each light guiding member 71 is oriented to the same position of an original, with the interposition of the platen glass 41 or the original reading glass 42. The light emitted from the light exit planes of the light guiding members 71 is incident on the same position of an original to illuminate this particular position of the original. The light reflected at the particular position of the original is guided as reading light through the slit St into the scanning unit 43. The reading light is sequentially reflected by the first to fifth reflection mirrors 51-55, and enters the CCD 47 through the imaging lens 46. Then, the CCD 47 reads an image on the front side of the original.

Figure 3:
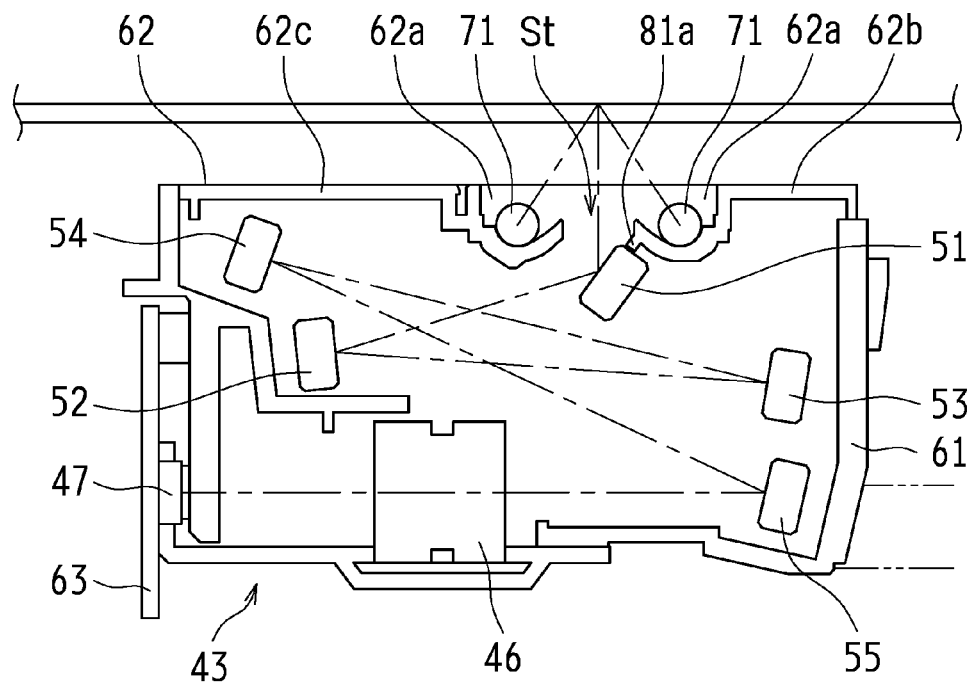
FIG. 3 is an enlarged cross section of a scanning unit.
Figure 4:
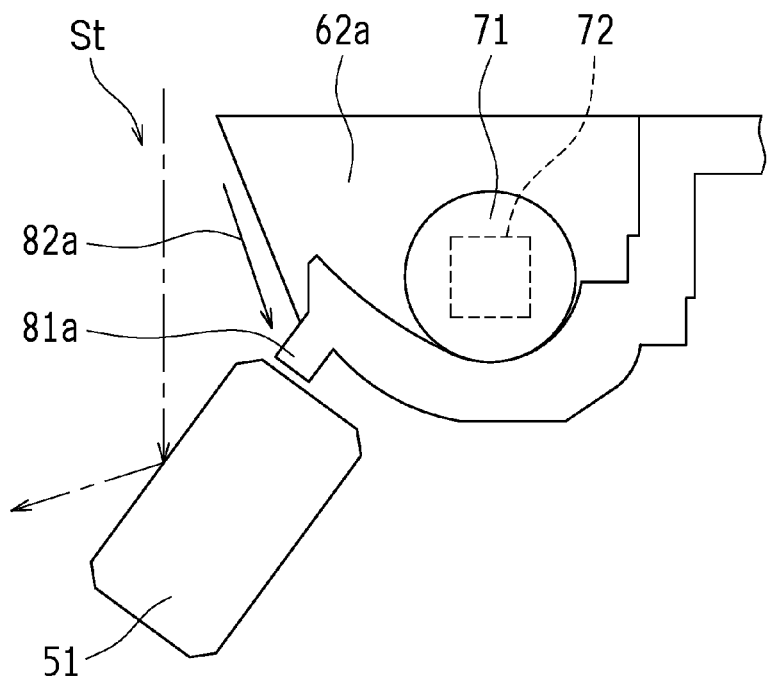
FIG. 4 is an enlarged partial cross section of the scanning unit, showing reading light and stray light inside the scanning unit.
Figure 5:
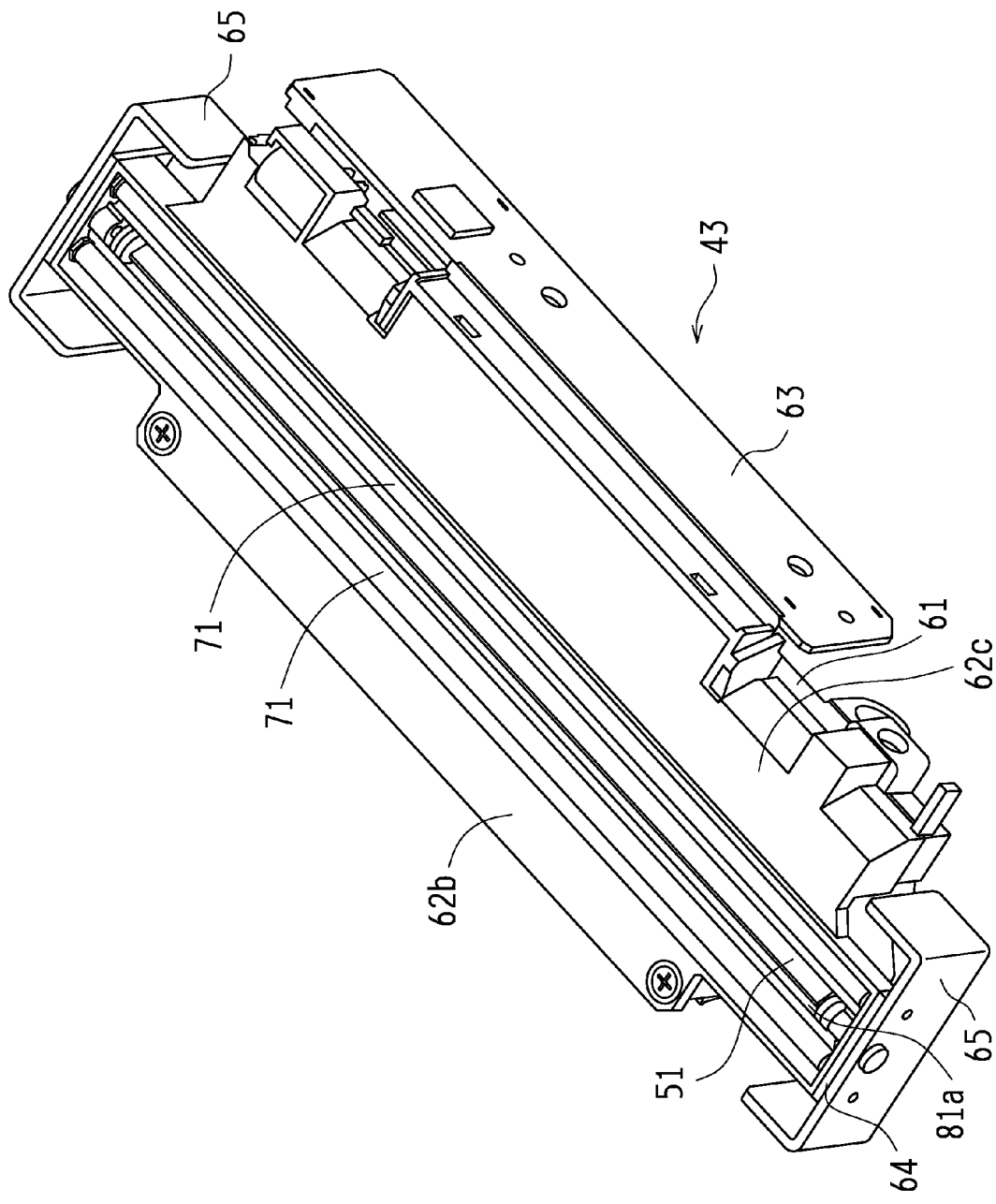
FIG. 5 is a perspective view of the scanning unit.
Figure 6:
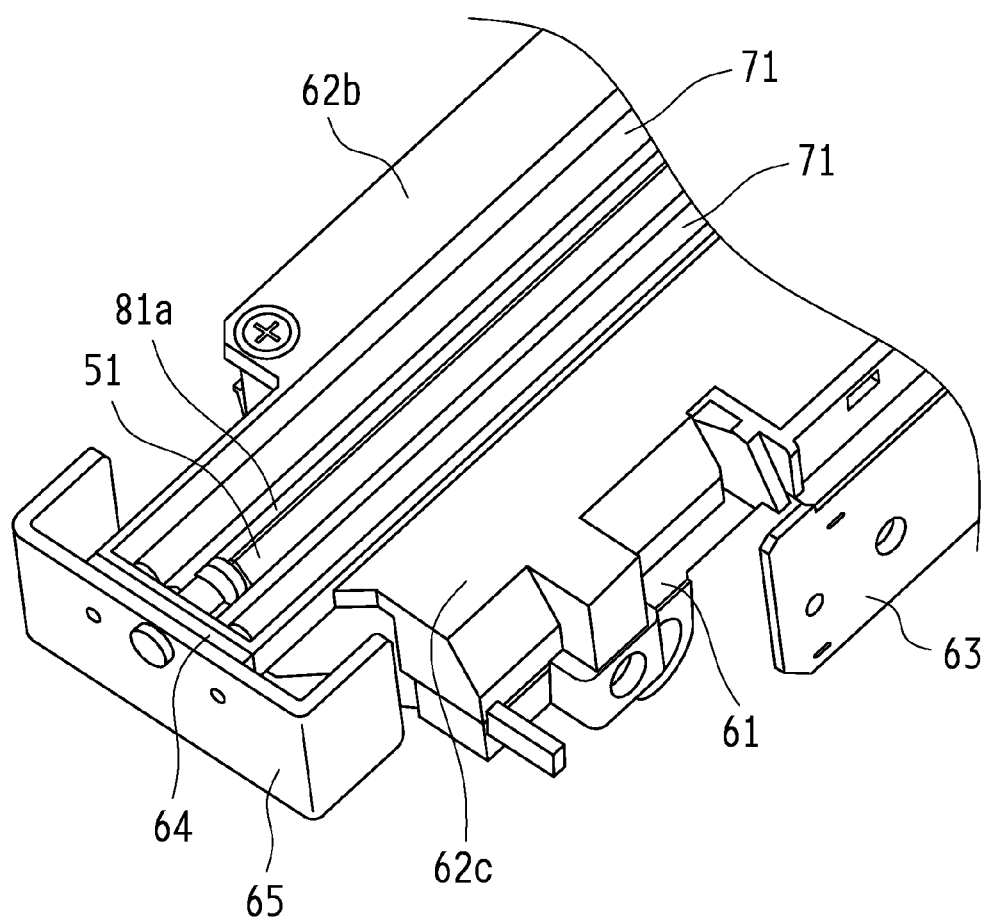
FIG. 6 is an enlarged perspective view of an end of the scanning unit.

Now, the configuration of the scanning unit 43 and the light source unit is described in greater detail. FIG. 3 is a cross section of the scanning unit 43. FIG. 4 is an enlarged partial cross section in the vicinity of the light blocking member in the light source unit. FIG. 5 is a perspective view of the scanning unit 43. FIG. 6 is an enlarged perspective view of an end of the scanning unit 43.

As shown in FIG. 3 to FIG. 6, the scanning unit 43 has an open-top housing 61, a lid-like holding member 62 which can open and close the opening at the top of the housing 61, a light source unit provided on the lid-like holding member 62, and a CCD board 63 provided on a longitudinal side wall of the housing 61 (a side wall which extends longitudinally, namely, in the main scanning direction X).

The housing 61 accommodates the imaging lens 46 and the first to fifth reflection mirrors 51-55. The lid-like holding member 62 substantially covers the opening at the top of the housing 61, and holds the light source unit. The CCD board 63 mounts the CCD 47, with the light-receiving surface of the CCD 47 facing the inside of the housing 61 through a slit (not shown) formed in the side wall of the housing 61.

The lid-like holding member 62 is provided with two engagement grooves 62a extending in the main scanning direction X and a slit St between the engagement grooves 62a. Each of the engagement grooves 62a receives the substantially columnar light guiding member 71. Accordingly, the shape of the engagement grooves 62a corresponds to a part of the columnar side face. The light source unit allows the light from the LEDs 72 to be incident on the light incident planes at both ends of each light guiding member 71, to exit from the light exit plane at one side surface of the light guiding member 71, and to illuminate an original through the platen glass 41 or the original reading glass 42. The reading light reflected by the original is transmitted through the platen glass 41 or the original reading glass 42, guided into the housing 61 through the slit St in the lid-like holding member 62, sequentially reflected by the first to fifth reflection mirrors 51-55, and finally enters the CCD 47 through the imaging lens 46.

In addition to the two light guiding members 71 and four LEDs 72, the light source unit is equipped with two LED boards 64 each mounting two LEDs 72, and two radiator plates overlaid on the outer surface of each LED board 64.

The light guiding members 71 are fitted in and held by the engagement grooves 62a at shielding parts 62b, 62c of the lid-like holding member 62, with both ends of each light guiding member 71 extending to the connecting parts on both sides of the lid-like holding member 62. The light incident planes of the two light guiding members 71 are positioned at opening apertures in the connecting parts. The LED boards 64 and the radiator plates are attached to the connecting parts. The LEDs 72 on the LED boards 64 are positioned at the opening apertures in the connecting parts. Namely, both ends of the two light guiding members 71, the LEDs 72, the two LED boards 64, and the two radiator plates are located on the outside of the housing 61.

Each of the first to fifth reflection mirrors 51-55 is provided with a reflective coat formed on one side of a piece of glass by silver vapor deposition, and has a reflecting surface on which the reflective coat is formed, end surfaces substantially orthogonal to the reflecting surface, and a back surface opposite to the reflecting surface. The cross sectional shape of these mirrors is generally rectangular, with chamfered corners. The first to fifth reflection mirrors 51-55 are fixed in the housing 61 by mirror holders (not shown), at predetermined positions and angles on the optical path of the reading light reflected by the original. The first reflection mirror 51, located substantially just under the slit St, is the first mirror on which the reading light coming through the slit St in the lid-like holding member 62 is incident.

As shown in FIG. 3 and FIG. 4, the light guiding members 71 are fitted in the engagement grooves 62a in the lid-like holding member 62. One of the engagement grooves 62a is integrated with a rib-shaped first light blocking portion 81a which extends longitudinally along the light guiding member 71, on the back side of the groove exposed to the inside of the housing 61. The longitudinal length of the first light blocking portion 81a is substantially equal to the longitudinal length of the first reflection mirror 51. The tip end of the rib-shaped first light blocking portion 81a is opposed to an end surface of the first reflection mirror 51, with a gap therebetween. These components are opposed in the vicinity of a chamfered corner between the end surface and the reflecting surface. Thus, the tip end of the first light blocking portion 81a does not cover the reflecting surface of the first reflection mirror 51, and does not contact with the first reflection mirror 51.

Since the tip end of the first light blocking portion 81a does not cover the reflecting surface of the first reflection mirror 51, this structure does not hamper entry of the reading light at the reflecting surface of the first reflection mirror 51, and can prevent vignetting of the reading light. If stray light enters the end surface of the first reflection mirror 51, the stray light that has entered from the end surface is transmitted through the glass of the first reflection mirror 51. As a result, stray light reflected or refracted inside the mirror is allowed to enter the inside of the housing 61. However, according to the present invention, the first light blocking portion 81a is opposed to the first reflection mirror 51 in the vicinity of the corner near the reflecting surface of the first reflection mirror 51, this structure can prevent the stray light 82a which enters through the slit St from being incident on the end surface of the first reflection mirror 51 and from reaching the CCD 47 through the inside of the housing 61. Since the length of the first reflection mirror 51 is substantially equal to the length of the first light blocking portion 81a, the above-mentioned measures against stray light can block stray light over the entire length of the first reflection mirror 51 and can improve the effect further.

Besides, since the tip end of the first light blocking portion 81a is separated by a gap from, and is not in contact with, the end surface of the first reflection mirror 51, this structure addresses deformation of the frame and other accidents due to external impact or heat during the operation or transport of the image forming apparatus and the image reading apparatus. In case of such accidents, this structure can avoid interference between the first reflection mirror 51 and the first light blocking portion 81a, and can reduce the risk of deviation of the optical axis of the first reflection mirror 51 due to deformation or fall of the first reflection mirror 51. The specific size of the gap is about 0.2 mm, for example, but should not be limited thereto. The gap may be in any size as far as the first reflection mirror 51 does not contact with the tip end of the first light blocking portion 81a and as far as the stray light which would otherwise pass through the gap can be blocked effectively.

Since the lid-like holding member 62 and the first light blocking portion 81a are molded as a single piece, it is possible to simplify the production process and to reduce the number of components than in the case where the first light blocking portion 81a is provided separately. Further, since the first reflection mirror 51 is fixedly positioned on the housing 61, a simple action of attaching the lid-like holding member 62 to the housing 61 completes positioning of the end surface of the first reflection mirror 51 with respect to the first light blocking portion 81a. This structure enables a simple and high-precision positioning of the components.

As additional effects, the rib shape adopted by the first light blocking portion 81a not only facilitates molding and demolding of the lid-like holding member 62, but also enhances the mechanical strength of the engagement grooves 62a whose shape corresponds to a part of the columnar side face and thereby prevents deformation of the frame.

FIG. 5 and FIG. 6 are perspective views of the scanning unit 43 in which the housing 61 and the lid-like holding member 62 are combined, as viewed from the platen glass 41 side. The light guiding members 71 are fitted in the engagement grooves 62a. The slit St between the two light guiding members 71 leads to the first reflection mirror 51 and the first light blocking portion 81a. The gap between the end surface of the first reflection mirror 51 and the tip end of the first light blocking portion 81a is narrow enough to block stray light, and not shown herein.

The first reflection mirror 51 is located directly below the slit St. When the reading light, emitted from the light exit planes of the light guiding members 71 in the light source unit and reflected by an original or an object to be illuminated, enters the inside of the housing through the slit St, the reading light is firstly reflected by the first reflection mirror 51 toward the second reflection mirror 52. Similarly, stray light except the reading light reflected by the original passes through the slit St and firstly reaches the first reflection mirror 51. Hence, the first reflection mirror 51 is affected by stray light more heavily than the second to fifth reflection mirrors 52-55, and requires sufficient measures against stray light.

According to the present invention as described above, the first light blocking portion 81a is provided face to face with the end surface of the first reflection mirror 51 which is arranged most closely to an original (an object to be illuminated), and the length of the first light blocking portion 81a is substantially equal to the length of the first reflection mirror 51. Accordingly, as shown in FIG. 4, the stray light 82a passing through the slit St and reaching the end surface of the first reflection mirror 51 can be effectively blocked by the first light blocking portion 81a. In addition, since the gap between the end surface of the first reflection mirror 51 and the first light blocking portion 81a is small, this structure has an effect of blocking entry of dust into the housing through the slit St which serves as the opening and preventing deterioration of optical characteristics caused by adhesion of dust inside the housing 61.

According to the first embodiment as described above, the end surface of the first reflection mirror 51 is opposed to the first light blocking portion 81a with a gap. This structure can prevent vignetting of the reading light on the reflecting surface side and can simultaneously prevent entry of the stray light 82a at the end surface of the first reflection mirror 51. Besides, even when the frame is deformed due to impact or heat on the apparatus, this structure can limit deformation or fall of the first reflection mirror 51, and can prevent deviation of the optical axis of the first reflection mirror 51. Accordingly, it is possible to provide an image reading apparatus and an image forming apparatus which are capable of preventing stray light sufficiently, while preventing not only deviation of the optical axis due to interference between the frame and the mirror but also vignetting of the reading light on the reflecting surface side of the mirror.

Second Embodiment

Figure 7:
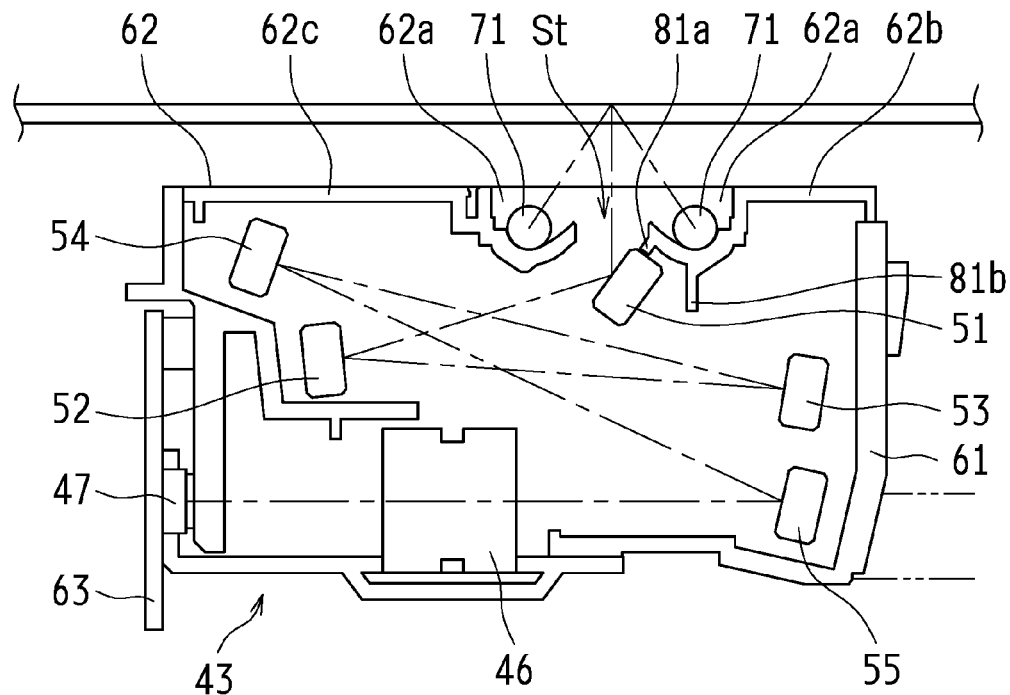
FIG. 7 is an enlarged cross section of a scanning unit according to the second embodiment.
Figure 8:
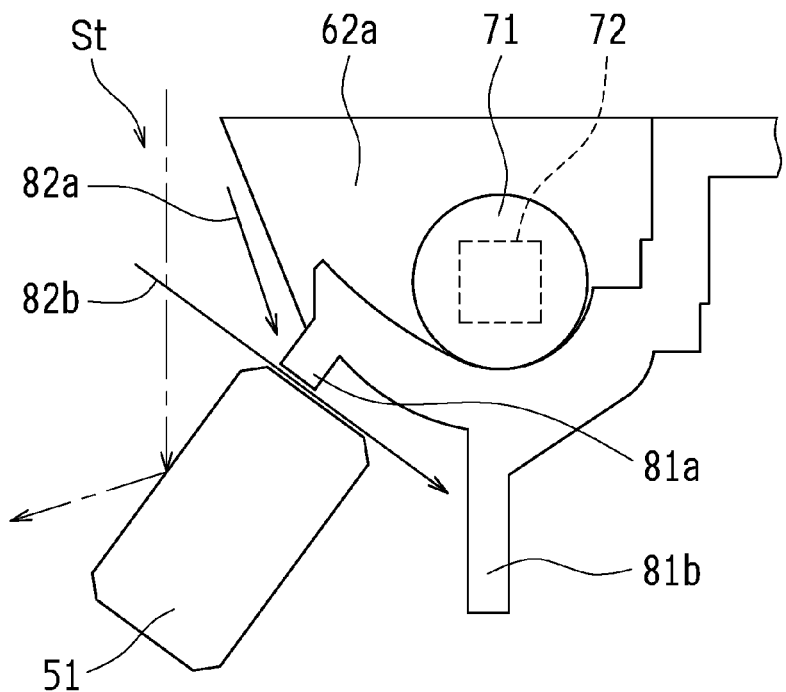
FIG. 8 is an enlarged partial cross section of the scanning unit according to the second embodiment, showing reading light and stray light inside the scanning unit.

FIGS. 7 and 8 are cross sections of the image reading apparatus in the image forming apparatus according to the second embodiment of the present invention. This embodiment provides a second light blocking portion 81b, in addition to the first light blocking portion 81a, on the back side of one of the engagement grooves 62a in the lid-like holding member 62. The rest of the components are similar to those mentioned in the first embodiment, and detailed description thereof is omitted.

As shown in FIG. 7 and FIG. 8, the light guiding members 71 are fitted in the engagement grooves 62a in the lid-like holding member 62. One of the engagement grooves 62a is integrated with the rib-shaped first light blocking portion 81a and the second light blocking portion 81b which extend longitudinally along the light guiding member 71, on the back side of the groove exposed to the inside of the housing 61.

The longitudinal length of the first light blocking portion 81a is substantially equal to the longitudinal length of the first reflection mirror 51. The tip end of the rib-shaped first light blocking portion 81a is opposed to an end surface of the first reflection mirror 51, with a gap therebetween. These components are opposed in the vicinity of a chamfered corner between the end surface and the reflecting surface. Thus, the tip end of the first light blocking portion 81a does not cover the reflecting surface of the first reflection mirror 51, and does not contact with the first reflection mirror 51.

The second light blocking portion 81b has a higher rib than the first light blocking portion 81a. The second light blocking portion 81b is situated on the back surface side of the first reflection mirror 51 opposite to the reflecting surface thereof, and extends perpendicularly downwardly, as seen in the figure, between the first reflection mirror 51 and the third reflection mirror 53. The rib of the second light blocking portion 81b is at least high enough to obstruct an imaginary straight line from the gap between the first reflection mirror 51 and the first light blocking portion 81a to the third reflection mirror 53, but not so high as to obstruct the optical path of the reading light reflected by the third reflection mirror 53 toward the fourth reflection mirror 54. Hence, similar to the first light blocking portion 81a, the second light blocking portion 81b does not cover the reflecting surfaces of the first reflection mirror 51 and the third reflection mirror 53, and does not contact with the first reflection mirror 51.

In this embodiment, the tip ends of the first light blocking portion 81a and the second light blocking portion 81b do not cover the reflecting surfaces of the first reflection mirror 51 and the third reflection mirror 53, respectively. This structure does not obstruct entry of the reading light at the reflecting surfaces of the first reflection mirror 51 and the third reflection mirror 53, and can prevent vignetting of the reading light.

If stray light enters the end surface of the first reflection mirror 51, the stray light that has entered from the end surface is transmitted through the glass of the first reflection mirror 51. As a result, stray light reflected or refracted inside the mirror is allowed to enter the inside of the housing 61. However, according to the present invention, the first light blocking portion 81a is opposed to the first reflection mirror 51 in the vicinity of the corner near the reflecting surface of the first reflection mirror 51, this structure can prevent the stray light 82a which enters through the slit St from being incident on the end surface of the first reflection mirror 51 and from reaching the CCD 47 through the inside of the housing 61. Since the length of the first reflection mirror 51 is substantially equal to the length of the first light blocking portion 81a, the above-mentioned measures against stray light can block stray light over the entire length of the first reflection mirror 51 and can improve the effect further.

Besides, not only the tip end of the first light blocking portion 81a is separated by a gap from, and is not in contact with, the end surface of the first reflection mirror 51, but also the second light blocking portion 81b is not in contact with the first reflection mirror 51. This structure addresses deformation of the frame and other accidents due to external impact or heat during the operation or transport of the image forming apparatus and the image reading apparatus. In case of such accidents, this structure can avoid interference between the first reflection mirror 51 and the first and second light blocking portions 81a, 81b, and can reduce the risk of deviation of the optical axis of the first reflection mirror 51 due to deformation or fall of the first reflection mirror 51. The specific size of the gap is about 0.2 mm, for example, but should not be limited thereto. The gap may be in any size as far as the first reflection mirror 51 does not contact with the tip end of the first light blocking portion 81a and as far as the stray light which would otherwise pass through the gap can be blocked effectively.

Since the lid-like holding member 62, the first light blocking portion 81a, and the second light blocking portion 81b are molded as a single piece, it is possible to simplify the production process and to reduce the number of components than in the case where the first light blocking portion 81a and the second light blocking portion 81b are provided separately. Further, since the first reflection mirror 51 is fixedly positioned on the housing 61, a simple action of attaching the lid-like holding member 62 to the housing 61 completes not only positioning of the end surface of the first reflection mirror 51 with respect to the first light blocking portion 81a, but also positioning of the second light blocking portion 81b between the gap and the third reflection mirror 53. This structure enables a simple and high-precision positioning of the components.

As additional effects, the rib shapes adopted by the first light blocking portion 81a and the second light blocking portion 81b not only facilitate molding and demolding of the lid-like holding member 62, but also enhance the mechanical strength of the engagement grooves 62a whose shape corresponds to a part of the columnar side face and thereby prevent deformation of the frame.

The longitudinal length of the second light blocking portion 81b may be longer or shorter than the first reflection mirror 51 and the first light blocking portion 81a. This is because the first to fifth reflection mirrors 51-55 which constitute the reflective unit of the image reading apparatus in the present invention are designed to reduce their longitudinal lengths gradually along the optical path of the reading light. In other words, the third reflection mirror 53 is shorter than the first reflection mirror 51. Therefore, the second light blocking portion 81b only needs to have a length sufficient to block the stray light entering the reflecting surface of the third reflection mirror 53, and is not essentially as long as the first reflection mirror 51. Nevertheless, for a sufficient blocking effect against the stray light, the second light blocking portion 81b is preferably designed as long as possible.

As shown in FIG. 8, the stray light 82a transmitted through the slit St into the housing 61 and advancing toward the end surface of the first reflection mirror 51 is blocked by the first light blocking portion 81a. The gap between the end surface of the first reflection mirror 51 and the tip end of the first light blocking portion 81a is so narrow as, for example, about 0.2 mm. Hence, light travelling at a considerable angle toward the end surface of the first reflection mirror 51 is unlikely to pass through this gap. However, if the stray light 82b advances in a direction parallel to the end surface of the first reflection mirror 51, the stray light 82b passes through the gap and advances toward the third reflection mirror 53.

In this embodiment, the second light blocking portion 81b is integrated with one of the engagement grooves 62a and is located between the gap and the reflecting surface of the third reflection mirror 53. Therefore, even if the stray light 82b may pass through the gap and may advance toward the third reflection mirror 53, the second light blocking portion 81b can block the stray light 82b to prevent the stray light 82b from being reflected by the third reflection mirror 53 and from reaching the CCD 47.

According to the second embodiment as described above, the end surface of the first reflection mirror 51 is opposed to the first light blocking portion 81a with a gap. This structure can prevent vignetting of the reading light on the reflecting surface side and can simultaneously prevent entry of the stray light 82a at the end surface of the first reflection mirror 51. Besides, even when the frame is deformed due to impact or heat on the apparatus, this structure can limit deformation or fall of the first reflection mirror 51, and can prevent deviation of the optical axis of the first reflection mirror 51. In addition, the second light blocking portion 81b provided between the gap and the third reflection mirror 53 can effectively block even the stray light 82b which has passed through the gap, and can further prevent the stray light from reaching the CCD 47. Accordingly, it is possible to provide an image reading apparatus and an image forming apparatus which are capable of preventing stray light sufficiently, while preventing not only deviation of the optical axis due to interference between the frame and the mirror but also vignetting of the reading light on the reflecting surface side of the mirror.

Third Embodiment

The direction in which the second light blocking portion 81b extends is not limited to the perpendicularly downward direction, but may be, for example, a direction parallel to the back surface side of the first reflection mirror 51. Also in this case, the rib of the second light blocking portion 81b is at least high enough to obstruct an imaginary straight line from the gap between the first reflection mirror 51 and the first light blocking portion 81a to the third reflection mirror 53, but not so high as to obstruct the optical path of the reading light reflected by the third reflection mirror 53 toward the fourth reflection mirror 54.

Hereinbefore, the preferred embodiments and modified examples of the present invention are described with reference to the attached drawings. Needless to say, however, the present invention should not be limited to these embodiments and examples. It is apparent that a person skilled in the art can conceive various changes and modifications within the scope recited in the claims. Such changes and modifications are naturally understood to be within the technological scope of the present invention.

DESCRIPTION OF THE REFERENCE NUMERALS 1 image forming apparatus
2 image reading apparatus
3 original transporting apparatus
4 printing unit
5 feeding cassette
11 optical scanning device 12 development device
13 photosensitive drum
14 drum cleaning device
15 charging unit
17 fixing device
21 intermediate transfer belt
26 secondary transfer device
43 scanning unit
46 imaging lens
47 CCD (reading unit)
51-55 first to fifth reflection mirrors
61 housing
62 lid-like holding member (holding member)
62a engagement grooves
63 CCD board
64 LED board (substrate)
71 light guiding member
72 LED (light emitting element)
81a first light blocking portion
81b second light blocking portion
82a, 82b stray light
St slit

What is claimed is:

1. An image reading apparatus comprising:
a scanner incorporating:
a light source unit for illuminating an object to be illuminated;
a reading unit for reading the object illuminated by the light source unit; and
a plurality of reflection mirrors for sequentially reflecting reading light reflected by the object toward the reading unit; and
a guide that enables the scanner to move with respect to the object,
wherein a first reflection mirror that first reflects the reading light, among the plurality of reflection mirrors, is arranged near a slit provided to guide the reading light into the scanner, the first reflection mirror partially blocking the slit.

2. The image reading apparatus according to claim 1, wherein
the plurality of reflection mirrors comprise a second reflection mirror that reflects the reading light reflected by the first reflection mirror, and
the second reflection mirror is arranged farther than the first reflection mirror from the object.

3. The image reading apparatus according to claim 1, wherein
the plurality of reflection mirrors, in the scanner, comprise
a final reflection mirror that is arranged upstream or downstream in a movement direction of the scanner and finally reflects the reading light, and
a pre-final reflection mirror that is arranged before the final reflection mirror and reflects the reading light toward the final reflection mirror, and
the final reflection mirror and the pre-final reflection mirror are arranged to face each other in the movement direction of the scanner.

4. The image reading apparatus according to claim 1, wherein
the plurality of reflection mirrors are arranged to face each other in a movement direction of the scanner, and
at least two of optical paths of the reading light reflected by the plurality of reflection mirrors intersect each other.

5. An image forming apparatus comprising:
the image reading apparatus according to claim 1.

6. An image reading apparatus comprising:
a scanner incorporating:
a light source unit for illuminating an object to be illuminated;
a reading unit for reading the object illuminated by the light source unit; and
a plurality of reflection mirrors for sequentially reflecting reading light reflected by the object toward the reading unit; and
at least one pair of rollers that move the object with respect to the scanner,
wherein a first reflection mirror that first reflects the reading light, among the plurality of reflection mirrors, is arranged near a slit provided to guide the reading light into the scanner, the first reflection mirror partially blocking the slit.

7. The image reading apparatus according to claim 6, wherein
the plurality of reflection mirrors comprise a second reflection mirror that reflects the reading light reflected by the first reflection mirror, and
the second reflection mirror is arranged farther than the first reflection mirror from the object.

8. The image reading apparatus according to claim 6, wherein
the plurality of reflection mirrors, in the scanner, comprise
a final reflection mirror that is arranged upstream or downstream in a movement direction of the scanner and finally reflects the reading light, and
a pre-final reflection mirror that is arranged before the final reflection mirror and reflects the reading light toward the final reflection mirror, and
the final reflection mirror and the pre-final reflection mirror are arranged to face each other in the movement direction of the scanner.

9. The image reading apparatus according to claim 6, wherein
the plurality of reflection mirrors are arranged to face each other in a movement direction of the scanner, and
at least two of optical paths of the reading light reflected by the plurality of reflection mirrors intersect each other.

10. An image forming apparatus comprising:
the image reading apparatus according to claim 6.

11. An image reading apparatus comprising:
a scanner incorporating:
a light source unit for illuminating an object to be illuminated;
a reading unit for reading the object illuminated by the light source unit; and
a plurality of reflection mirrors for sequentially reflecting reading light reflected by the object toward the reading unit; and
a scanning mechanism that moves the scanner relatively with respect to the object,
wherein a first reflection mirror that first reflects the reading light, among the plurality of reflection mirrors, is arranged near a slit provided to guide the reading light into the scanner, the first reflection mirror partially blocking the slit.

12. The image reading apparatus according to claim 11, wherein
the plurality of reflection mirrors comprise a second reflection mirror that reflects the reading light reflected by the first reflection mirror, and
the second reflection mirror is arranged farther than the first reflection mirror from the object.

13. The image reading apparatus according to claim 11, wherein
the plurality of reflection mirrors, in the scanner, comprise
a final reflection mirror that is arranged upstream or downstream in a movement direction of the scanner and finally reflects the reading light, and
a pre-final reflection mirror that is arranged before the final reflection mirror and reflects the reading light toward the final reflection mirror, and
the final reflection mirror and the pre-final reflection mirror are arranged to face each other in the movement direction of the scanner.

14. The image reading apparatus according to claim 11, wherein
the plurality of reflection mirrors are arranged to face each other in a movement direction of the scanner, and
at least two of optical paths of the reading light reflected by the plurality of reflection mirrors intersect each other.

15. An image forming apparatus comprising:
the image reading apparatus according to claim 11.

* * * * *